United States Patent
Oriakhi et al.

(10) Patent No.: US 7,381,360 B2
(45) Date of Patent: *Jun. 3, 2008

(54) SOLID FREE-FORM FABRICATION OF THREE-DIMENSIONAL OBJECTS

(75) Inventors: Christopher Oriakhi, Corvallis, OR (US); Isaac Farr, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

This patent is subject to a terminal disclaimer.

(21) Appl. No.: 10/700,603

(22) Filed: Nov. 3, 2003

(65) Prior Publication Data

US 2005/0093194 A1  May 5, 2005

(51) Int. Cl.
*B29C 35/08* (2006.01)
*B29C 41/02* (2006.01)
(52) U.S. Cl. ...................... 264/463; 264/113
(58) Field of Classification Search ................ 264/113, 264/494, 463
See application file for complete search history.

(56) References Cited

U.S. PATENT DOCUMENTS

| | | | |
|---|---|---|---|
| 5,204,055 A | 4/1993 | Sachs et al. | |
| 5,340,656 A | 8/1994 | Sachs et al. | |
| 5,387,380 A | 2/1995 | Cima et al. | |
| 5,740,051 A | 4/1998 | Sanders, Jr. et al. | |
| 5,902,441 A | 5/1999 | Bredt et al. | |
| 6,146,567 A | 11/2000 | Sachs et al. | |
| 6,165,406 A | 12/2000 | Jang et al. | |
| 6,259,962 B1 | 7/2001 | Gothait | |
| 6,322,728 B1 * | 11/2001 | Brodkin et al. | 264/113 X |
| 2002/0016386 A1 | 2/2002 | Napadensky | |
| 2002/0114941 A1 * | 8/2002 | Franke et al. | 428/320.2 |
| 2004/0036200 A1 * | 2/2004 | Patel et al. | 264/401 |
| 2005/0017394 A1 * | 1/2005 | Hochsmann et al. | 264/113 |

OTHER PUBLICATIONS

Lembo, John, "Three Dimensional Printing," Advanced Materials & Processes, Jan. 2002.
Brown, Paul Wencil, "Cements Research Progress 1990."
Blazdell, P.F. and J.R.G. Evans, "Preparation of Ceramic Inks for Solid Freeforming Using a Continuous Jet Printer," Journal of Materials Symthesis and Processing, vol. 7, No. 5, 1999.
Evans, J.R.G., "Direct Ink Jet Printing of Ceramics: Experiment in Teleology," British Ceramic Transactions, vol. 100, No. 3, 2001.
Song, Jin Hua, Mohan J. Edirisinghe, and Julian R.G. Evans, "Formulation and Multilayer Jet Printing of Ceramic Inks," Journal of the American Ceramic Society, 82 (12) 3374-80 (1999).
Merlin, Fabrice, Helene Lombols, Stephane Joly, Nicolas Lequeux, Jean-Louis Halary and Henri Van Damme, "Cement-polymer and clay-polymer nano-and meso-composites: spotting the difference," J. Mater. Chem., 2002, 12, 3308-3315.

* cited by examiner

*Primary Examiner*—Leo B Tentoni

(57) ABSTRACT

The present invention is drawn toward compositions, methods, and systems for solid free-form fabrication of three-dimensional objects. In one embodiment, a system for solid free-form fabrication of three-dimensional objects can comprise a particulate composition, a substrate configured for supporting at least a layer of the particulate composition in a defined region, and a liquid phase binder configured for being jetted in the defined region to polymerize at least a portion of the particulate composition to form a polymeric cement. Using this system in a layer by layer deposition process, three-dimensional objects can be formed. The particulate composition can include from 70 wt % to 99.9 wt % of polymeric particulates, and from 0.1 wt % to 10 wt % of a polymerization initiator. The liquid phase binder can include from 70 wt % to 90 wt % of polymerizable monomers and from 0.1 wt % to 10 wt % of a polymerization accelerator.

16 Claims, No Drawings

SOLID FREE-FORM FABRICATION OF THREE-DIMENSIONAL OBJECTS

FIELD OF THE INVENTION

The present invention is drawn toward the production of solid three-dimensional objects, such as for prototyping applications. More particularly, the present invention is drawn to the free-form fabrication of three-dimensional objects using acrylic polymer cement.

BACKGROUND OF THE INVENTION

Printing technologies can be used to create three-dimensional objects from data output of a computerized modeling source. For example, one can design a three-dimensional object using a computer program, and the computer can output the data of the design to a printing system capable of forming the solid three-dimensional object. More specifically, solid free-form fabrication (or layer manufacturing) can be defined generally as a fabrication technology used to build a three-dimensional object using layer by layer or point-by-point fabrication. With this fabrication process, complex shapes can be formed without the use of a pre-shaped die or mold.

Essentially, with such a system, an object can be designed using a computer program, such as a Computer Aided Design (CAD) application. Once the object has been designed three-dimensionally, solid free-form fabrication technology enables the translation of the computer-generated model into a three-dimensional object. This technology is useful in areas such as verifying a CAD model, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, prototyping, and providing production runs, to name a few.

In one type of solid free-form fabrication, a dispensing system such as an ink-jet dispensing system, and optionally, a curing or hardening system, are used to dispense liquid build material for forming three-dimensional objects, as well as support material for supporting the build material as it hardens. Thus, the dispensed liquid of the build material is hardened or cured to form the object. Alternatively, powder beds that contain a dry cement mix have been used wherein an ink-jet dispensing system is used to hydrate, and ultimately cure, the cement mix to form the cement.

In this evolving area of technology, there has been a desire to provide new materials and methods of manufacture that are relatively easy to employ, provide rigid structures, and are relatively quick in their formation. Thus, additional methods, systems, and/or compositions that meet these criteria would be an advancement in the art.

SUMMARY OF THE INVENTION

It has been recognized that certain methods and compositions can be used for free-form fabrication of three-dimensional objects. As such, a method of fabricating a three-dimensional object can comprise steps of depositing a particulate composition in a defined region, ink-jetting a liquid phase binder onto a predetermined area of the particulate composition to form polymeric cement in the predetermined area, and repeating the depositing and ink-jetting steps such that multiple layers of the polymeric cement are formed that are bound to one another.

Alternatively, a system for solid free-form fabrication of three-dimensional objects can comprise a particulate composition, a substrate configured for supporting at least a layer of the particulate composition in a defined region, and a liquid phase binder configured for being jetted in the defined region to polymerize at least a portion of the particulate composition to form a polymeric cement.

With respect to the method and system described above, the particulate composition can include from 70 wt % to 99.9 wt % of polymeric particulates and from 0.1 wt % to 10 wt % of a polymerization initiator. The liquid phase binder can include from 70 wt % to 90 wt % of polymerizable monomers and from 0.1 wt % to 10 wt % of a polymerization accelerator.

In another embodiment, a solid three-dimensional object can comprise multiple layers of polymeric cement deposited in contact with one another, wherein the polymeric cement has a polymer content greater than 80 wt %. The polymeric cement can be prepared by contacting a liquid phase binder with a particulate composition. The particulate composition includes from 70 wt % to 99.9 wt % of polymeric particulates and from 0.1 wt % to 10 wt % of a polymerization initiator, and the liquid phase binder can include from 70 wt % to 90 wt % of polymerizable monomers and from 0.1 wt % to 10 wt % of a polymerization accelerator.

Additional features and advantages of the invention will be apparent from the detailed description that follows, which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

The term "ink-jetting" or "jetting" refers to compositions that are ejected from jetting architecture, such as ink-jet architecture. The use of the term "ink-jetting" does not infer that it is necessarily "ink" that is being jetted from the architecture. Ink-jet architecture can include thermal or piezo architecture.

The term "solid three-dimensional object" or "three-dimensional object" refers to objects that are formed by the fabrication method of the present invention. Solid three-dimensional objects are sufficiently solid or firm so as to maintain a fixed volume and shape to an extent which is appropriate for use in solid free-form fabrication. In some embodiments, such objects need not be strictly rigid, such as in cases where the object formed is self-supporting, at minimum, or even flexible.

The term "solidifying," or the like, refers to a change that occurs when a dry cement mix or particulate composition is contacted and reacted with a liquid phase binder. In accordance with embodiments of the present invention, polymeric particulates of a particulate composition can become copolymerized or even crosslinked with liquid monomers present in a liquid phase binder upon polymerization of the monomers. This typically occurs due to the presence of a polymerization initiator in the particulate composition and a polymerization accelerator present in the liquid phase binder.

As used herein, "liquid phase binder" refers to the liquid fluid that can be prepared for jetting from ink-jet architecture. Components that can be present in the liquid phase binder include polymerizable monomers and polymerization accelerators. Other components can also be present including liquid stabilizers, and in some embodiments, water. Additionally, other components can be present to improve jettability properties, build properties (such as object strength and reduced shrinkage after drying), solidifying properties, and the like. Example of such added components include a variety of different agents, including surfactants, organic solvents and co-solvents, buffers, biocides, sequestering agents, viscosity modifiers, low molecular weight polymers, etc. Colorant can optionally be added to the liquid phase binder as well.

The term "dry cement mix" or "particulate composition" is used to describe dry particulate compositions that can be contacted with a liquid phase binder to form a polymeric cement in accordance with embodiments of the present invention.

The use of the term "cement" or "polymeric cement" is intended to include the compositions formed upon combining the particulate composition and liquid phase binder, in accordance with embodiments of the present invention. This typically occurs due to the presence of a polymerization initiator in the particulate composition and a polymerization accelerator present in the liquid phase binder. The term "cement" refers to the state of the composition while in a wet or dry state, as well as while polymerization is occurring and after polymerization has completed.

The term "particulate" or "particle" includes fine dry powders and/or crystals.

The term "colorant" includes both pigments and dyes.

The term "shrinkage minimizing agent" refers to compositions that can be included in aqueous liquids, in accordance with embodiments of the present invention, which reduce the effects of size or shape altering that can occur as cement dries or cures.

When referring to a "predetermined area," the layering of polymeric cement composition to form a three-dimensional object permits the predetermined area to vary from layer to layer. For example, a predetermined area that is used in the formation of a layer of cement can be redefined upon application of subsequent layers, depending on the shape to be formed in accordance with systems and methods of the present invention. In other words, as each layer of formed cement is typically of a slightly different shape, by definition, the predetermined area will be different within a defined region.

A "build platform" or "build bin" is the rigid substrate which can include side walls that is used to hold the dry cement mix and support a solid three-dimensional object as it is being formed.

Concentrations, amounts, molecular sizes, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 wt % to about 5 wt %" should be interpreted to include not only the explicitly recited concentration of about 0.1 wt % to about 5 wt %, but also include individual concentrations and the sub-ranges within the indicated range. Thus, included in this numerical range are individual concentrations such as 1 wt %, 2 wt %, 3 wt %, and 4 wt %, and sub-ranges such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than about 5 wt %" should be interpreted to include all values and sub-ranges between 0 wt % and 5 wt %. Furthermore, such an interpretation should apply regardless of the breadth of the range or the characteristics being described.

With these definitions in mind, a method of fabricating a three-dimensional object can comprise steps of depositing a particulate composition in a defined region, ink-jetting a liquid phase binder onto a predetermined area of the particulate composition to form polymeric cement in the predetermined area, and repeating the depositing and ink-jetting steps such that multiple layers of the polymeric cement are formed that are bound to one another.

Alternatively, a system for solid free-form fabrication of three-dimensional objects can comprise a particulate composition, a substrate configured for supporting at least a layer of the particulate composition in a defined region, and a liquid phase binder configured for being jetted in the defined region to polymerize at least a portion of the particulate composition to form a polymeric cement.

With respect to the method and system described above, the particulate composition can include from 70 wt % to 99.9 wt % of polymeric particulates and from 0.1 wt % to 10 wt % of a polymerization initiator. The liquid phase binder can include from 70 wt % to 90 wt % of polymerizable monomers, such as acrylate monomers and/or methacrylate monomers, e.g., methylmethacrylate, and from 0.1 wt % to 10 wt % of a polymerization accelerator.

In another embodiment, a solid three-dimensional object can comprise multiple layers of polymeric cement deposited in contact with one another, wherein the polymeric cement has a polymer content greater than 80 wt %. The polymeric cement can be prepared by contacting a liquid phase binder with a particulate composition. The particulate composition includes from 70 wt % to 99.9 wt % of polymeric particulates and from 0.1 wt % to 10 wt % of a polymerization initiator, and the liquid phase binder can include from 70 wt % to 90 wt % of polymerizable monomers and from 0.1 wt % to 10 wt % of a polymerization accelerator.

In accordance with embodiments of the present invention, generally, three-dimensional printing techniques that employ a layered printing process are provided. These systems and methods typically involve the spreading of a layer of a particulate composition into a build bin, followed by dispensing a liquid phase binder, such as with an ink-jet printhead, to react with or cause a layer of the particulates of the particulate composition to react. This process can then be repeated over and over, lowering the build bin with respect to the ink-jet architecture after printing on each layer, or raising the ink-jet architecture with respect to the build bin after printing on each layer, until a three-dimensional object is formed. Typically, the fabricated object can be retrieved by removing the unbound particulates and extracting the part. The particulate composition provides the majority of the bulk of the formed object, and the liquid phase binder is used to bind and define the shape of the fabricated object, as well as initiate a polymerization and/or crosslinking reaction.

Particulate Composition

With respect to the methods, systems, and compositions described herein, various embodiments in accordance with the present invention can be practiced. As mentioned, the particulate composition includes from 70 wt % to 99.9 wt % of polymeric particulates and from 0.1 wt % to 10 wt % of a polymerization initiator. Examples of polymeric particulates that can be used include acrylate particulates, methacrylate particulates, siloxane particulates, and combinations thereof. In one embodiment, the methacrylate particulates can include polymethylmethacrylate homopolymers or copolymers having a weight average molecular weight from 20,000 Mw to 1,000,000 Mw. If a copolymer is used, then the other polymer(s) can include other vinylic polymers that can be copolymerized therewith, as are known generally in the art. Alternatively, the polymeric particulates can include oligomeric powders such as epoxynovolac acrylates, polyester acrylates, or siloxane oligomers. With respect to the polymerization initiator, suitable compositions that can be used include free radical initiator bases and/or organic peroxides. In one embodiment, the polymerization initiator can be dibenzoyl peroxide.

In that certain embodiments can utilize less than 100 wt % of the polymeric particulates and polymerization initiator, other particulate components can also be present in the particulate composition, such as ordinary Portland dry cement mix, ferrite dry cement mix, sulfoferrite, sulfoaluminoferrite, nanoparticle fillers, plasticizers, crosslinking agents, other polymers, and drying and setting accelerators. For example, in one embodiment, nanoparticles can be used, and can be substantially from 1 to 1000 nm in size. The nanoparticles can be blended within the particulate composition at from 0.1 wt % to 20 wt %. Exemplary nanoparticles include inorganic nanoparticles, organic-inorganic hybrid nanocomposites, curable liquid crystals, or combinations thereof. Examples of inorganic nanoparticles include silica, alumina, titania, zirconia, hydroxyapatite, layered double hydroxide (LDH), and combinations thereof. Examples of organic-inorganic hybrid nanocomposites include montmorillonite organo-clay, PMMA-clay nanocomposites, epoxy-clay nanocomposites, PMMA-co-MMA clay nanocomposites, starch-clay nanocomposites, and combinations thereof. Examples of curable liquid crystals include low viscosity oligomeric liquid crystals, reactive monomeric liquid crystals, and combinations thereof.

Liquid Phase Binder

With respect to the liquid phase binder that can be jetted onto the particulate composition to form a polymeric cement, many different formulations can be used. For example, the liquid phase binder can include water, though this is not required. In one embodiment, the liquid phase binder can typically predominantly include acrylate or methacrylate monomers and a polymerization accelerator. The monomer, for example, can include methylmethacrylate, and the polymerization accelerator can be an amine. Specific examples of polymerization accelerators include N,N-dimethyl-p-toluidine and dihydroxyethyl-p-toluidine. The polymerization accelerator is typically present to react with the polymerization initiator of the particulate composition. For example, in one specific embodiment, if a polymeric initiator is typically activated at a temperature that is higher than room temperature, and it is desired to cause it to begin polymerization at room temperature, an appropriately configured polymerization accelerator can be used to activate the polymerization initiator at room temperature. Other embodiments can also be implemented as would be known by those skilled in the art after considering the present disclosure.

In addition to the monomers and the polymerization accelerator described above, the liquid phase binder can also include other ingredients. For example, the liquid phase binder can be configured to include a stabilizer or an inhibitor, such as hydroquinone, to improve the stability of the liquid phase binder as a whole. Additionally, minor amounts of other ingredients can be included as well, such as surfactants, organic solvents and co-solvents, buffers, biocides, sequestering agents, viscosity modifiers, low molecular weight polymers, etc. Colorant can also optionally be added to the liquid phase binder as well if it is desired to modify the color of the object being formed. The liquid phase binder, if desired, can also include a shrinkage minimizing agent. These agents can include organic co-solvents that minimize reduction in size and/or shape upon drying of the cement. Exemplary shrinkage minimizing agents include 2,5-dimethylpropanediol and/or pentaerythriol.

Polymeric Cement Formation

In accordance with embodiments of the present invention, the use of a particulate composition or dry cement mix that when wetted with an appropriately configured liquid phase binder in multiple layers can form an advanced composite material that is substantially devoid of macropore defects or large flaws. This property can provide a finished polymeric cement layered object that possesses good mechanical, physical, and chemical properties, as well as provide a smooth outer surface. The presence of the high polymer content in both the particulate composition and the liquid phase binder can result in enhanced closeness of packing of the cement particles (hence low porosity), and the reaction, such as through cross-linking, provides good strength and rigidity as can be desired for three-dimensional object fabrication.

In an exemplary preparatory embodiment, the liquid phase binder can be housed by an ink-jet architecture configured for ink-jetting onto the particulate composition. A substrate can also be present that is configured for carrying the particulate composition in a defined region, such as in a build bin. The defined region can be configured with respect to the ink-jet pen such that the liquid phase binder, upon being ink-jetted from the ink-jet pen, contacts a layer of the particulate composition. In a more detailed embodiment, the system can be configured for applying multiple cement layers in succession that bind successively to one another to form a three-dimensional object. Layers can be applied sequentially by raising the position of the ink-jet architecture with respect to the substrate, and/or by lowering the position of the substrate with respect to the ink-jet architecture. After adjusting the distance between the ink-jet architecture and the substrate, an additional layer of particulate composition can be applied to the cement layer formed previously. In one embodiment, the combination of the particulate composition and the liquid phase binder can be cured either layer by layer, or periodically, using a UV source, such as a UV lamp.

As described, polymeric cementation of the present invention can be as a result of free radical polymerization by a photo or thermal initiator and/or cross-linking. Additionally, not only can individual layers become crosslinked, but crosslinking can occur between layers, thereby improving layer by layer adhesion. As a result, the solidified object formed can be characterized by markedly enhanced mechanical properties with respect to increased toughness and fracture resistance.

There are several advantages of the present invention. For example, a new particulate material is provided that is capable of use with three-dimensional printing techniques that can contain a very high content of polymer, e.g., more than 80 to 99 wt % of polymer. This material also sets and solidifies rapidly, and provides a relatively to very smooth surface finish, as well as provides good abrasion resistance and toughness. Additionally, unlike traditional cements, because of the high polymer content, the compositions or objects formed in accordance with embodiments of the present invention can be engineered to be flexible rather than strictly rigid. Additionally, these objects can exhibit good environmental stability compared to three-dimensional objects prepared using the more classical glass-ionomer materials and gypsum-based powder materials, i.e. these materials can degrade in water/moisture.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

A particulate composition is prepared in accordance with embodiments of the present invention. The particulate composition includes several components, including several optional components, in accordance with Table 1 below:

TABLE 1

| Ingredients | Amount |
| --- | --- |
| Polymethylmethacrylate (60,000 g/mol Mw; 10–70 microns) | 20 wt % |
| Polymethylmethacrylate/methacrylic acid copolymer (34,000 g/mol Mw; 10–70 microns) | 70 wt % |
| montmorillonite organo-clay polymer nanocomposite filler (<600 nm) | 5 wt % |
| Titanium dioxide filler (<600 nm) | 3.5 wt % |
| Dibenzoyl peroxide | 1.5 wt % |

Example 2

A liquid phase binder composition is prepared in accordance with an embodiment of the present invention. The liquid phase binder includes several components, including multiple optional components, as shown in Table 2 below:

TABLE 2

| Ingredients | Amount |
| --- | --- |
| Methylmethacrylate monomers | 90 wt % |
| Hydroxyethylmethacrylate monomers | 7 wt % |
| N,N-dimethyl-p-toluidine | 2.8 wt % |
| Hydroquinone | 0.001 wt % |
| colorant | 0.199 wt % |

Example 3

The dry particulate composition (dry cement mix) of Example 1 is spread out as a first particulate layer in a build bin. The liquid phase binder of Example 2 is then applied to the first particulate layer using an ink-jet pen. A first layer of polymeric cement having a predetermined shape is formed. After 5 to 60 seconds of setting/polymerization, a second particulate layer is applied to the first layer of polymeric cement. Additional liquid phase binder is then applied to the second particulate layer, thereby forming a second layer of cement. This procedure may be continued, adding layer upon layer until a desired three-dimensional object is formed. After allowing the three-dimensional object to set, polymerize, crosslink, and dry, the object is removed from the unbound particulate composition. It is believed that the cement setting mechanism included free radical polymerization and crosslinking reactions.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A method of fabricating a three-dimensional object, comprising:
   a) depositing a particulate composition in a defined region, said particulate composition including:
      i) from 70 wt % to 99.9 wt % of polymeric particulates, and
      ii) from 0.1 wt % to 10 wt % of a polymerization initiator;
   b) jetting a liquid phase binder onto a predetermined area of the particulate composition to form a layer of polymeric cement in the predetermined area, said liquid phase binder including:
      i) from 70 wt % to 90 wt % of polymerizable monomers, and
      ii) from 0.1 wt % to 10 wt % of a polymerization accelerator;
   c) repeating steps a) and b) such that multiple layers of polymeric cement are formed that are bound to one another.

2. A method as in claim 1, wherein the particulate composition further comprises from 0.1 wt % to 20 wt % of nanoparticle fillers.

3. A method as in claim 1, wherein the polymeric particulates include a member selected from the group consisting of acrylate particulates, methacrylate particulates, siloxane particulates, and combinations thereof.

4. A method as in claim 3, wherein the polymeric particulates include polymethylmethacrylate homopolymers or copolymers having a weight average molecular weight from 20,000 Mw to 1,000,000 Mw.

5. A method as in claim 1, wherein the polymerization initiator includes a member selected from the group consisting of a free radical initiator base and an organic peroxide.

6. A method as in claim 5, wherein the polymerization initiator includes dibenzoyl peroxide.

7. A method as in claim 1, wherein the liquid phase binder further comprises a liquid stabilizer.

8. A method as in claim 1, wherein the polymerizable monomers include a member selected from the group consisting of acrylate monomers, methacrylate monomers, and combinations thereof.

9. A method as in claim 8, wherein the polymerizable monomers include methylmethacrylate monomers.

10. A method as in claim 1, wherein the polymerization accelerator includes an amine.

11. A method as in claim 1, wherein the polymerization accelerator includes N,N-dimethyl-p-toluidine.

12. A method as in claim 1, wherein the polymerization accelerator includes dihydroxyethyl-p-toluidine.

13. A method as in claim 1, wherein the liquid phase binder further includes a colorant.

14. A method as in claim 1, further comprising the step of removing a portion of the particulate composition that does not form the polymeric cement.

15. A method as in claim 1, wherein the particulate composition and the liquid phase binder are reacted in the presence of UV energy.

16. A method of fabricating a three-dimensional object, comprising:
   a) depositing a particulate composition in a defined region, said particulate composition including:
      i) polymeric particulates, wherein the polymeric particulates include a member selected from the group consisting of acrylate particulates, methacrylate particulates, siloxane particulates, and combinations thereof, and
      ii) a polymerization initiator, wherein the polymerization initiator includes a member selected from the group consisting of a free radical initiator base and an organic peroxide;
   b) jetting a liquid phase binder onto a predetermined area of the particulate composition to form a layer of polymeric cement in the predetermined area, said liquid phase binder including:
      i) polymerizable monomers, and
      ii) a polymerization accelerator, wherein the polymerization accelerator is selected from an amine, N,N-dimethyl-p-toluidine, and dihydroxyethyl-p-toluidine;
   c) repeating steps a) and b) such that multiple layers of polymeric cement are formed that are bound to one another.

* * * * *

UNITED STATES PATENT AND TRADEMARK OFFICE
CERTIFICATE OF CORRECTION

PATENT NO.        : 7,381,360 B2
APPLICATION NO.   : 10/700603
DATED             : June 3, 2008
INVENTOR(S)       : Christopher Oriakhi et al.

Page 1 of 1

It is certified that error appears in the above-identified patent and that said Letters Patent is hereby corrected as shown below:

In column 10, lines 18-19, in Claim 16, delete "dihydroxyethyl-p-toluid me" and insert -- dihydroxyethyl-p-toluidine --, therefor.

Signed and Sealed this

Twelfth Day of May, 2009

JOHN DOLL
*Acting Director of the United States Patent and Trademark Office*